June 3, 1952  H. H. HEBESTREIT  2,599,107
JOINTING AND MOLDING MACHINE
Filed June 29, 1950  5 Sheets-Sheet 1

Herold H. Hebestreit
INVENTOR.

June 3, 1952     H. H. HEBESTREIT     2,599,107
JOINTING AND MOLDING MACHINE
Filed June 29, 1950     5 Sheets-Sheet 2

Herold H. Hebestreit
INVENTOR.

June 3, 1952 H. H. HEBESTREIT 2,599,107
JOINTING AND MOLDING MACHINE
Filed June 29, 1950 5 Sheets-Sheet 3
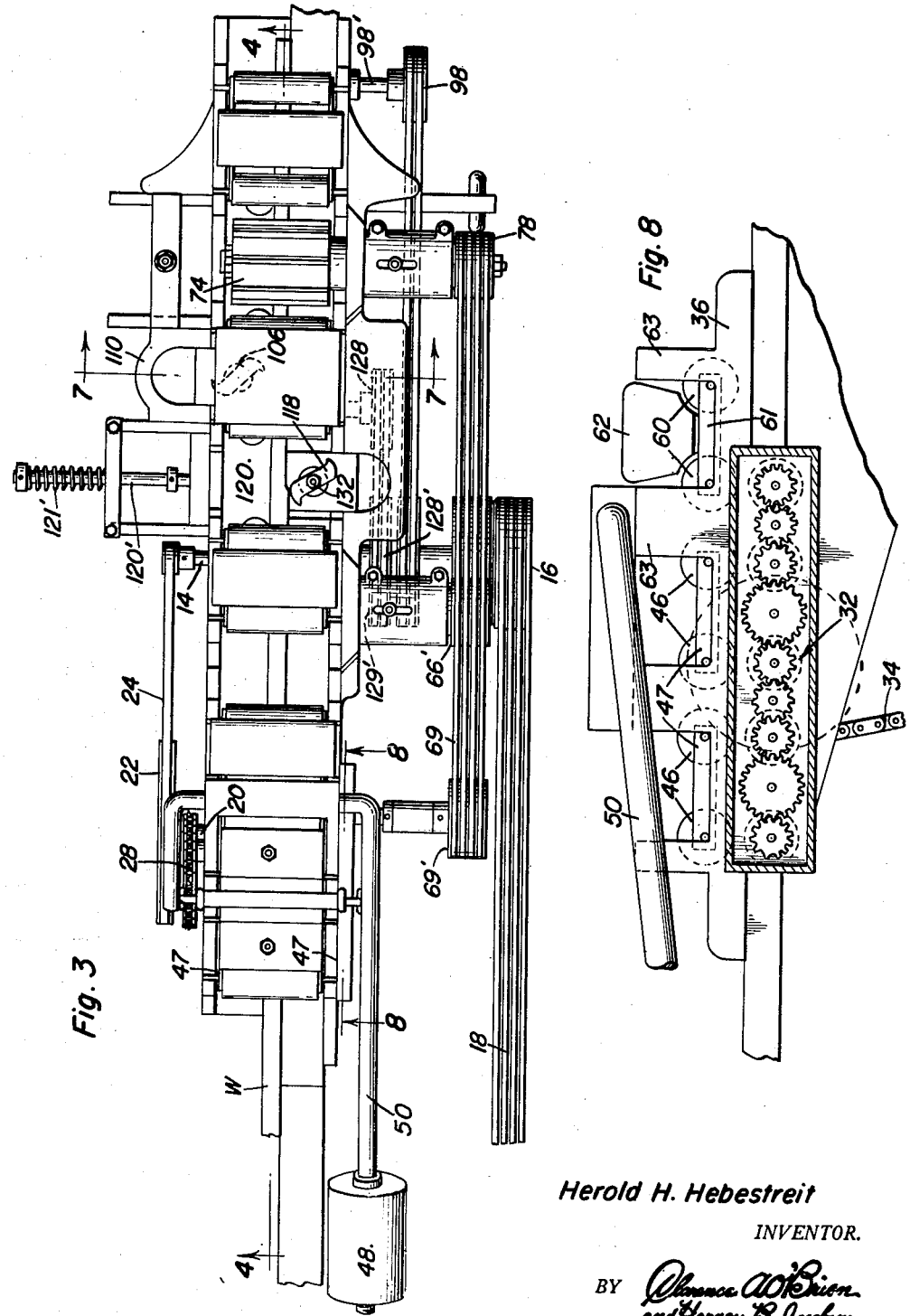
Herold H. Hebestreit
INVENTOR.

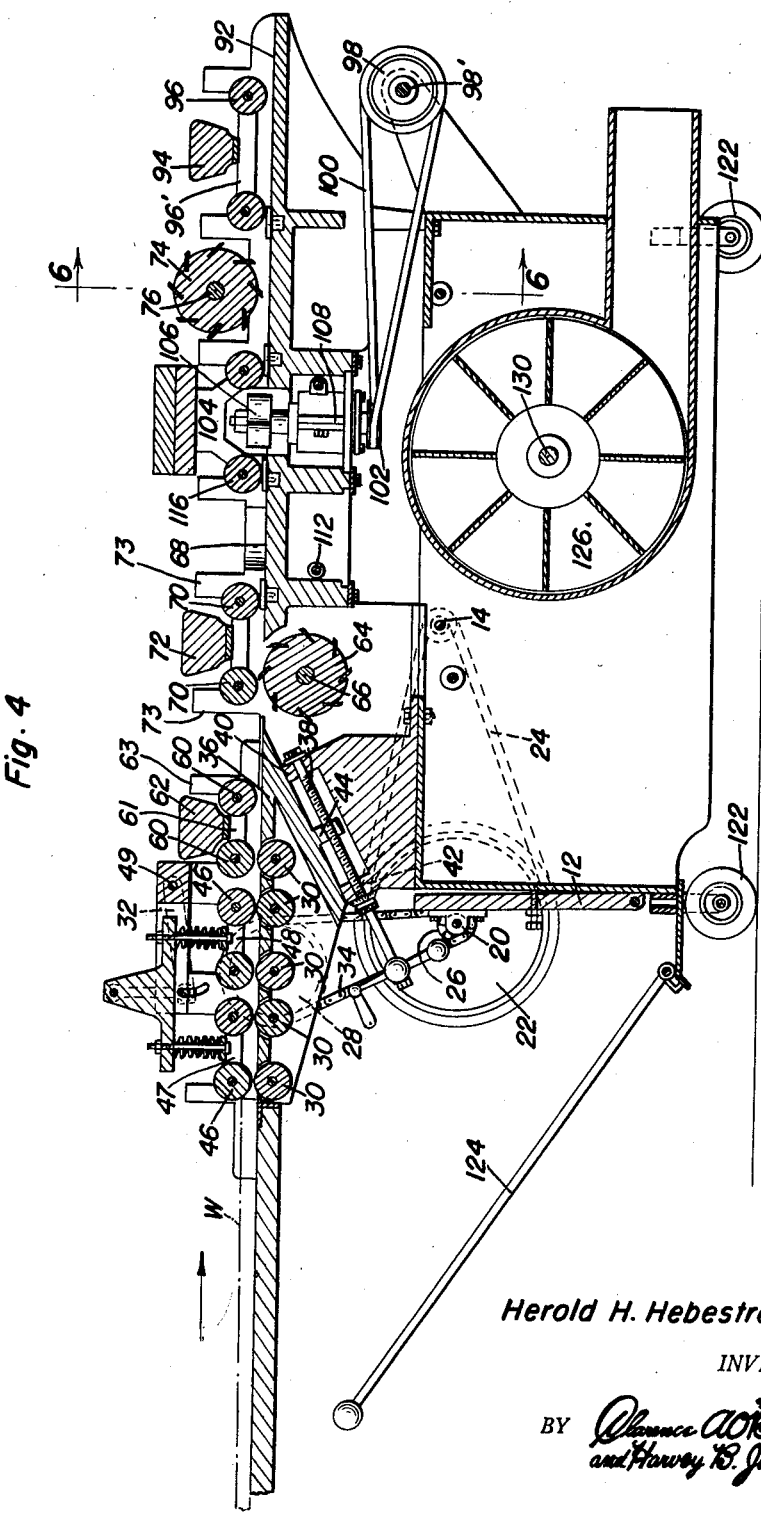

June 3, 1952 H. H. HEBESTREIT 2,599,107
JOINTING AND MOLDING MACHINE
Filed June 29, 1950 5 Sheets-Sheet 5
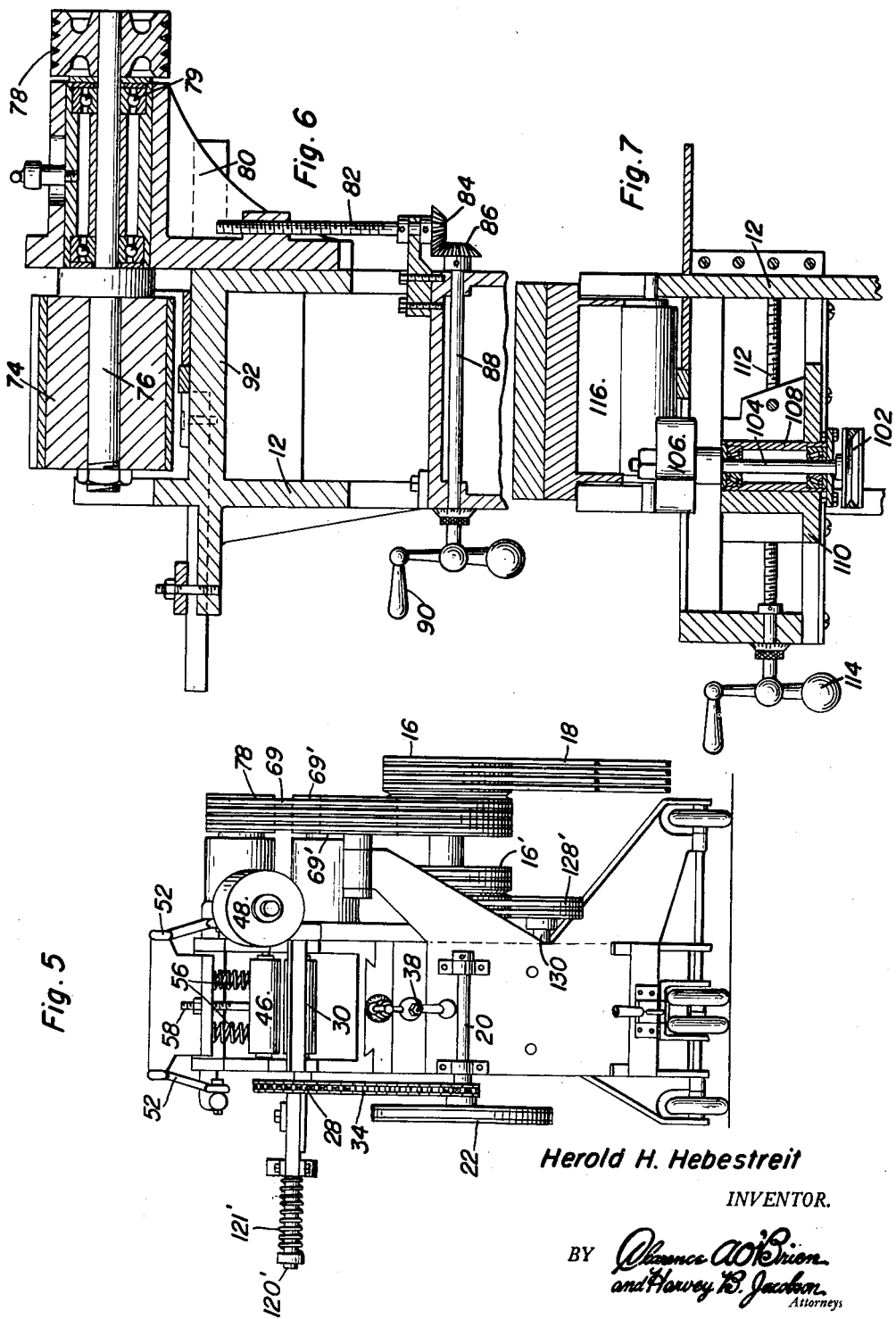
Herold H. Hebestreit
INVENTOR.

Patented June 3, 1952

2,599,107

UNITED STATES PATENT OFFICE 2,599,107

JOINTING AND MOLDING MACHINE

Herold H. Hebestreit, Mio, Mich.

Application June 29, 1950, Serial No. 171,030

3 Claims. (Cl. 144—36)

This invention relates to woodworking apparatus, and more particularly to a novel machine for jointing and planing strips of wood to a desired configuration.

An object of this invention is to provide a high speed woodworking machine in which the material is sent through the machine at a high rate of speed and in which it is desirable to employ a machine almost continuously with little interruption in the character of the work done by the machine.

Another object of this invention is to provide novel means for guidingly and feedingly urging strips of lumber or other work pieces into engagement with the cutter blades of the machine.

Still another object is to provide a highly efficient drafting and planing machine which will cut during the passage of the work piece through the machine the suitable grooves or tongues or other configurations in the work piece as desired, thus eliminating separate operations.

A further object of this invention is to provide novel means for adjustably and guidingly feeding the work piece into engagement with the cutter blades.

Still further objects of the invention reside in the provision of a jointing and planing machine that is strong, durable, highly efficient in operation, capable of being readily powered from any convenient prime mover, and which completes its operation to leave a highly satisfactory product as a result.

These, together with the various ancillary objects of the invention which will become apparent as the following description proceeds, are attained by this jointing and planing machine, a preferred embodiment of which has been illustrated in the accompanying drawings, by way of example only, wherein:

Figure 3 is a top plan view of the jointing and molding machine;

Figure 4 is a vertical sectional view as taken along line 4—4 of Figure 3;

Figure 5 is a rear elevational view of the invention;

Figure 6 is an enlarged vertical sectional view as taken along line 6—6 of Figure 4;

Figure 7 is an enlarged vertical sectional view as taken along line 7—7 in Figure 3; and Figure 8 is a vertical sectional view as taken along line 8—8 in Figure 3, and being shown on an enlarged scale for greater clarity.

Figure 1:
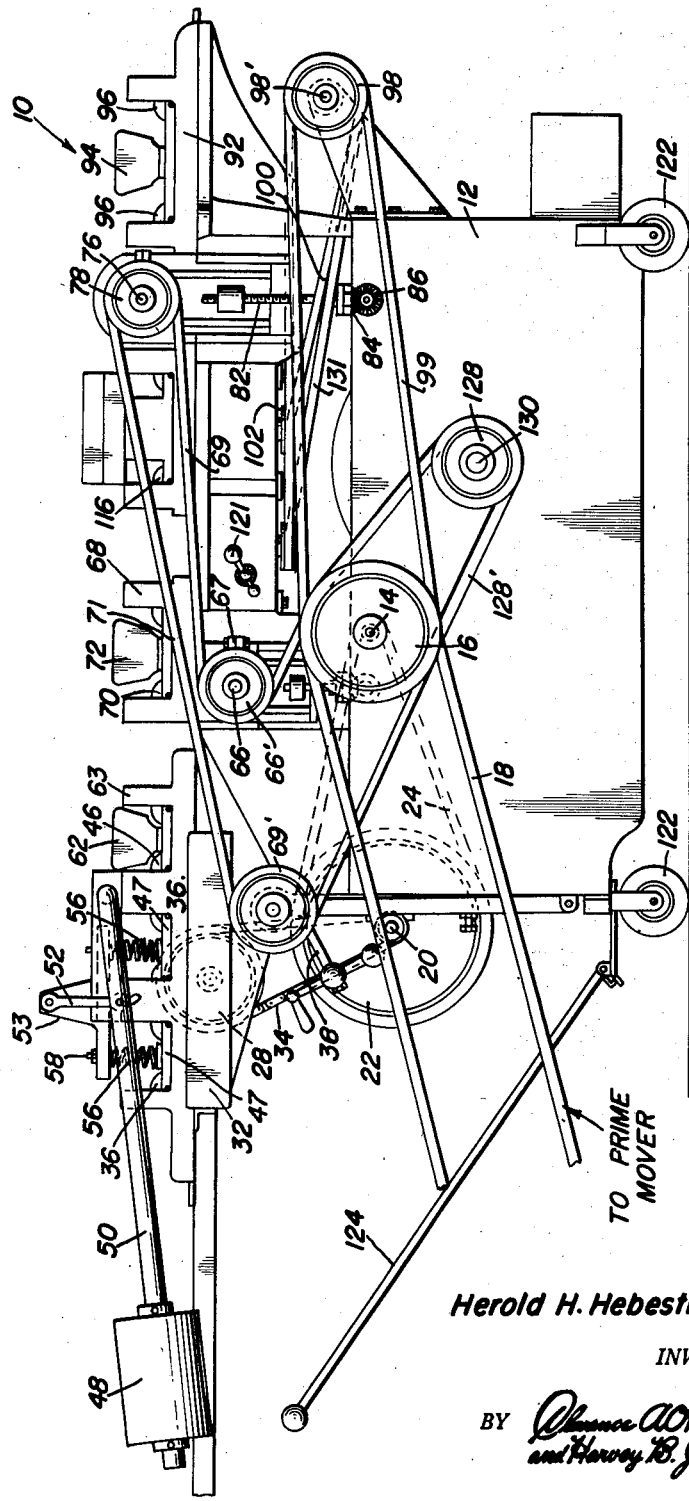
Figure 1 is a side elevational view of the invention showing the arrangement of the pulleys for actuating the various elements of the machine.
Figure 2:
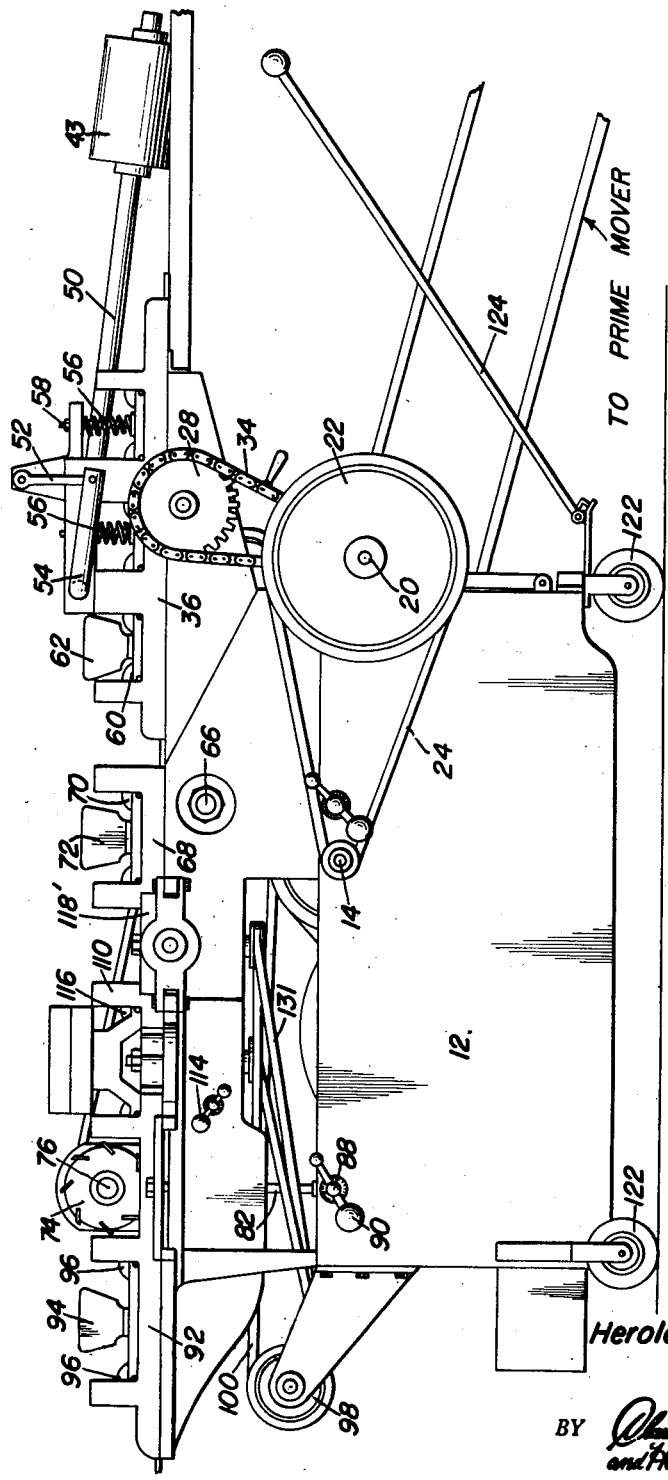
Figure 2 is another side elevational view as taken from the opposite side of the device from that shown in Figure 1.

With continuing reference to the accompanying drawings, wherein like reference numerals designate similar parts throughout the various views, the reference numeral 10 generally designates this jointing and planing machine having a frame 12 in which a shaft 14 is journaled to which shaft there is secured the drive pulley 16. By means of belts 18, the drive pulley is operatively secured to a suitable prime mover, not shown, for actuating the entire mechanism. Also journaled on the frame 12 is a shaft 20 to which there is secured a pulley wheel 22 driven by a belt and pulley connection 24 from the shaft 14, said shaft 20 having a sprocket wheel 26 thereon connected by a sprocket chain 34 to a sprocket wheel 28 driving one of a series of coplanar work feeding rollers 30, adjacent the rear end of the machine, through the gears as generally indicated at 32 in Figure 8.

Rollers 30 are rotatably mounted on a platform 36 and there is provided a suitable adjusting screw 38 threadedly engaged in flanges 40 and 42 secured to the frame 12 and with flange 44 secured to the platform 36. In this manner, the platform 36 can be raised or lowered due to the angular position of the flanges 40, 42 and 44.

Supported above the rollers 30 is a series of work guiding and presser rollers 46 mounted in pairs in end brackets 47 which are forced downwardly for engagement of said rollers 46 with the piece work W by the action of a weight 48 on one end of a lever arm 50 pivoted at its other end, as at 49, on the platform 36 and connected by pivoted links 52 to a presser head 53. The presser head 53 is suitably, yieldingly, connected to said brackets 47 by coil springs 66 and bolts 58 to yieldingly urge said brackets 47 and rollers 46 downwardly against a piece of work W fed between said rollers 30 and 46 and as shown in Figure 3. Another pair of presser rollers 60 in advance of the rollers 30, 36 are mounted above the platform 36 in end brackets 61 and vertically movable therewith between guides 61 on the platform 36. A weight 62 on said brackets 61 urges said rollers 60 into tight engagement with the work W fed between the platform 36 and said rollers 60.

A lower cutting member 64 in advance of the platform 36 is secured to a shaft 66 mounted in suitable bearings 67 attached to the frame 12. The shaft 66 is rotated through a suitable pulley 66' and a belt 69 trained around the drive pulley 16 and around an idler pulley 69' and also around a pulley 78 the function of which will presently appear. A work supporting platform 68 is supported by the frame 12 slightly in advance of the cutter 64 and is surmounted by a pair of presser rollers 70 connected by end brackets 71 weighted as at 72 for guidingly maintaining the work piece in engagement with the wheel external element 64 said brackets 71 and rollers 70 being vertically movable in guides 73. An upper cutter 74 mounted on shaft 76 is drivingly connected to the main drive pulley 16 through the belt 69 pulley 78 and, as can be best seen from an inspection of Figure 6, the shaft 76 is supported by suitable bearings 79 and a carriage 80 which can be adjusted through screw 82, bevel gears 84 and 86, shaft 88, and handle 90. Thus, the height of the upper cutting element 74 can be readily controlled. Another roller supporting platform 92 is provided in advance of the platform 68 and surmounted, forwardly of the cutter 74 by a pair of presser rollers 96 connected by end brackets 96' weighted as at 94, and vertically movable between guides 92.

Drivingly connected with the drive pulley 16' on shaft 14 through belt 99 to pulley wheel 98 on the shaft 98' and through belt and pulley connection 100 from shaft 98' is a pulley wheel 102 which drives shaft 104 on which the side cutter element 106 is secured directly behind cutter 74. As can be readily seen from Fig. 7, the shaft 104 is supported by bearings 108 on the carriage 110 and the relative position of the carriage 110 can be readily adjusted by means of screw 112 supported in the frame 12 and in the carriage 110. The screw 112 is actuated through handle 114. There are also mounted above the carriage 110 suitably vertically movable rollers 116 connected, and weighted and guided for vertical movement like the rollers 66, 70 for engagement with the work piece.

Continuously urging the work piece into engagement with the other side cutter 118, Fig. 3 is a spring-pressed carriage 120 having a suitable guide 118' thereon and being spring pressed by a suitably arranged spring 121' on a rod 120' fixed to said carriage. This side cutter carriage 120 is actuated by handle 121. A belt and pulley connection 131 from the shaft 98' to the shaft 132 of the side cutter 118 drives said side cutter.

The frame 12 is supported on wheels 122 and a drawbar 124 is provided for drawing the machine to a suitable place of operation. A fan 126, Fig. 4, is provided on a fan shaft 130 having a pulley 128 thereon connected by a belt 128' to a pulley 129' on the shaft 14. The fan 126 is of a suitable suction and blower type for taking in cuttings dropping from the cutters 64, 118, 106 and 74, and blowing the cuttings forwardly of the machine.

Since, from the foregoing, the construction and advantages of this jointing and planing machine are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

Having described the invention, what is claimed as new is:

1. In a wood working machine for strip material, a platform structure over which the work is adapted to be fed and having a rear feed end from which the work is fed forwardly, said structure including a vertically adjustable platform section adjacent said feed end, a series of driven coplanar work feeding rollers mounted in said adjustable section for unitary vertical adjustment thereby toward the work, a presser head above said series of rollers, a series of work feeding and presser rollers above the first named series connected in spring pressed pairs to said presser head, a cutter for operation against the bottom of the work rotatable about an axis transverse to said structure and extending upwardly through said structure forwardly of said series of rollers, and a pair of driven side cutters rotatable about vertical axes at opposite sides of the work forwardly of the first cutter and staggered relatively to dispose one forwardly of the other.

2. In a wood working machine according to claim 1, wherein one of said side cutters is mounted on a spring pressed carriage.

3. In a wood working machine according to claim 1, wherein a weighted pivoted lever and pivoted links connect said lever to said presser head to press said second series of rollers against the work.

HEROLD H. HEBESTREIT.

REFERENCES CITED

The following references are of record in the file of this patent:

UNITED STATES PATENTS

| Number | Name | Date |
|--------|------|------|
| 248,962 | Thomas | Nov. 1, 1881 |
| 364,743 | Woods | June 14, 1887 |
| 366,841 | Johnson | July 19, 1887 |
| 463,577 | Doane | Nov. 17, 1891 |
| 617,023 | Johnson | Jan. 3, 1899 |
| 717,454 | Rosen | Dec. 30, 1902 |
| 830,378 | Smith et al. | Sept. 4, 1906 |